No. 811,841. PATENTED FEB. 6, 1906.
P. R. GLASS.
HOOK SETTING MACHINE.
APPLICATION FILED OCT. 18, 1904.
3 SHEETS—SHEET 3.
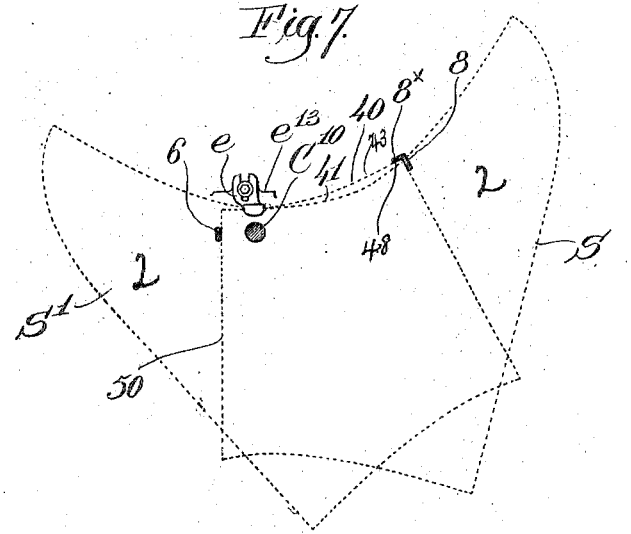
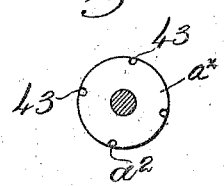
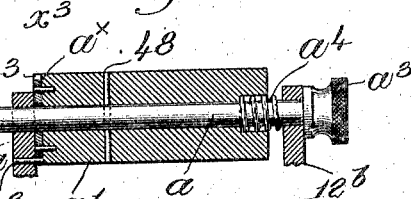
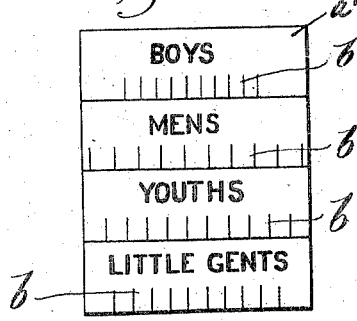
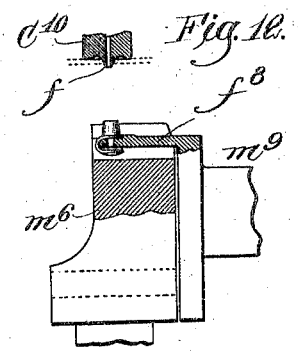
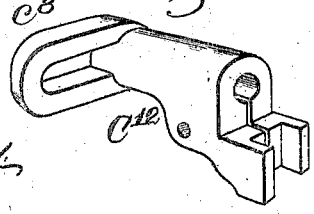
Witnesses.
Thomas J. Drummond
S. Wm. Lutton
Inventor.
Perley R. Glass,
by Crosby & Gregory
Attys

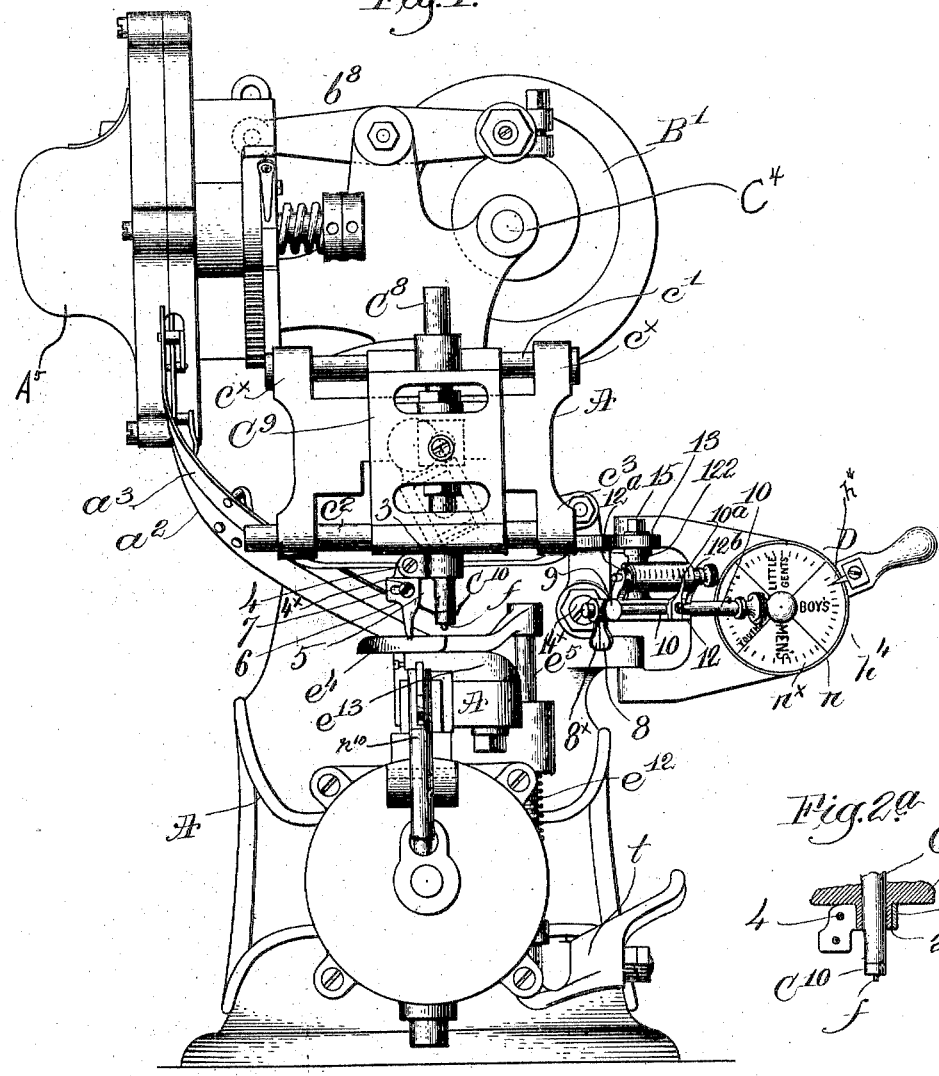

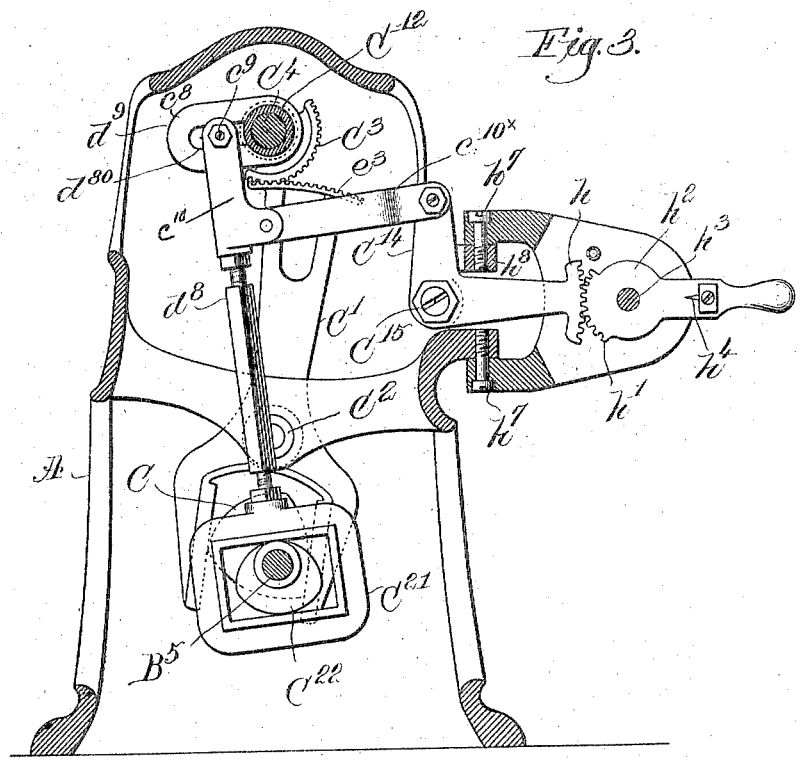
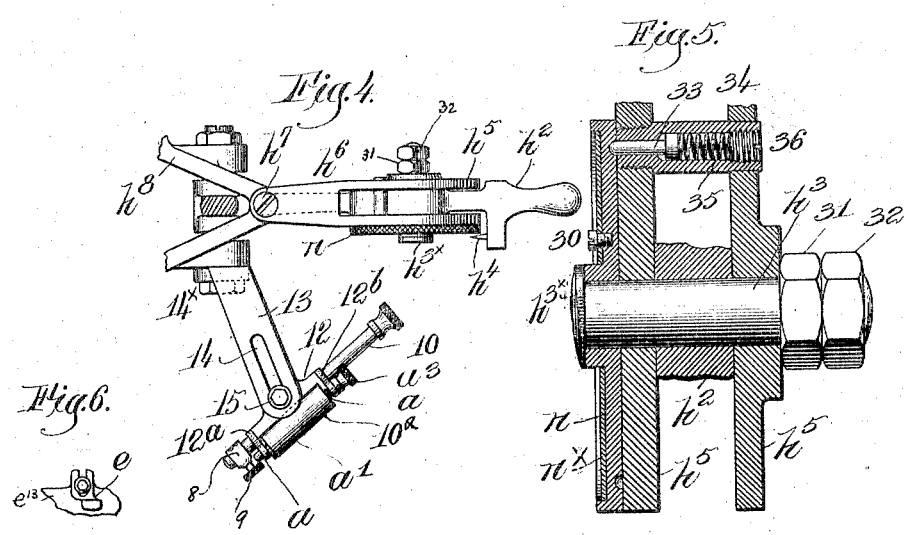

UNITED STATES PATENT OFFICE.

PERLEY R. GLASS, OF QUINCY, MASSACHUSETTS, ASSIGNOR TO THE PEERLESS MACHINERY COMPANY, OF BOSTON, MASSACHUSETTS, A CORPORATION OF MASSACHUSETTS.

HOOK-SETTING MACHINE.

No. 811,841.   Specification of Letters Patent.   Patented Feb. 6, 1906.

Application filed October 18, 1904. Serial No. 229,003.

*To all whom it may concern:*

Be it known that I, PERLEY R. GLASS, a citizen of the United States, residing at Quincy, in the county of Norfolk and State of Massachusetts, have invented an Improvement in Hook-Setting Machines, of which the following description, in connection with the accompanying drawings, is a specification, like characters on the drawings representing like parts.

This invention has for its object the production of a novel gage to insure that the lacing-hook nearest the upper end of the top part of the upper at each side and also the hook most distant therefrom nearest the lower end of the upper shall be set at exactly the distance provided for each size of shoe, and thereafter the remaining hooks of each series of studs will be set automatically. One of the gages is shown as moving with the slide-frame carrying the punch as the series of studs are being automatically set one after the other in the stock. Further, I have provided the machine with novel means whereby after setting the gage nearest the punch and anvil at the desired distance therefrom I may set all the hooks to be set in each side of the upper of a series of shoes of the same size at exactly the same distance apart.

It will be understood that each upper has the same number of hooks whatever the size of the shoe; but the smaller the shoe the more closely the predetermined number of hooks will be set, and I have provided means whereby the gage having been set for shoes of one class the distance over which the stock is fed in setting hooks in the same class of shoe, but of a different size, may be varied automatically to accurately set and space the hooks properly in the uppers of shoes of any other size of the same class.

Figure 1 in front elevation represents a sufficient portion of a hook-setting machine substantially such as represented in United States application, Serial No. 178,241, filed October 23, 1903, to which my improvements have been applied. Fig. 2 is a detail, partially in section, showing part of the means employed for sustaining one of the gages. Fig. 2ª is a detail showing part of the slide-frame and its boss embracing the clamping-ring sustaining the top gage that moves with the punch and set. Fig. 3 is a detail showing some of the means for controlling the lateral throw of the stock-feeding means. Fig. 4 is a plan view showing one of the gage members, together with the upper edge of the index and some parts coacting therewith. Fig. 5 shows an enlarged section of the feed-regulating index. Fig. 6 shows the edge gage and part of the work-support. Fig. 7 is a diagrammatical figure showing the top part of both the right and left hand side of the shoe in position to receive the first hook. Fig. 8 is a longitudinal section through the indicator coacting with the gage. Fig. 9 is a face view of the disk $a^\times$, located at the end of the roller $a'$, the shaft $a$ upon which said roller is mounted being in section. Fig. 10 shows the indicator supposed to be slitted longitudinally and laid out flat. Fig. 11 shows detached the sleeve $C^{12}$, that engages and moves the hook-frame that the punch may feed the upper after each stud is set; and Fig. 12 shows part of the under plunger, hook-sustaining plate, and part of the set and its central punch.

Referring to the drawings, A represents the framework; $C^9$, a slide-frame that receives and guides a bar $C^8$, to the lower end of which is secured the combined punch and anvil $C^{10}$ and $f$. These parts and the raceway $a^2 \, a^3$, the shaft $C^4$, the hopper $A^5$, cam-groove $B'$, guide-rod $c'$, held in ears $c^\times$ of the front of the framework and on which the head $C^9$ is reciprocated as the punch $f$ in the stock is moved laterally to feed the same, the rod $c^2$, held in said frame and sliding freely in the ears $c^3$, said frame carrying the bar $C^8$ vertically therein, the sector $C^3$, secured to said shaft $C^4$ and moved by the teeth $e^3$ of a lever $C'$, pivoted at $C^2$ and moved from a cam $C$ on shaft $B^5$, said shaft reciprocating the shaft $C^8$ in the frame $C^9$, the slotted arm $c^8$, extended from a sleeve $C^{12}$, (see Fig. 11,) surrounding said shaft $C^4$ loosely and connected at its front end loosely with and sliding the frame $C^9$ while the punch is in the stock to thus move the same to automatically space the hooks one from the other, the yoke $C^{21}$, moved by cam $C^{22}$ and connected with block $c^{10}$ by an adjustable rod, the link $c^{10\times}$, the stud $c^9$, connected with block $c^{10}$, the work-support $e^{13}$, the lifting presser-foot $e^4$, having a depending rod $e^5$, surrounded by a spring $e^{12}$, the lever $t$ for lifting said rod, the lever $n^{10}$, loosely connected with and for moving the hook-sustaining plate $f^8$, carried at the top of the lower plunger $m^6$, are and may be all substantially as shown in said application.

This application relates more especially to novel gaging means to be used in connection with an automatically-operating hook-setting machine, substantially such as shown in said application. The lower end of the slide-frame $C^9$ is provided with a boss 2, (see Fig. 2ª,) that is surrounded by a split clamp 3, one end of which receives a stud-screw 4. The clamp has a depending end that receives a screw $4^×$, extended through a slot 7 in the upper end of the top end gage 6 for the left half of the shoe, so that said gage may be adjusted with relation to the end of the combined anvil and punch that is reciprocated in said head, as provided for in said application. The other top end gage for the top end of the right half of the shoe is numbered 8, and it is shaped to present a corner to receive the end of said top, the lip $8^×$ of said gage receiving against it that edge 40 of the top end of the upper which is parallel with the hooks to be set. The top end gage 8 is attached to a slide-rod 10 by a set-screw 9. The rod 10 has attached to it by a screw $10^b$ (see Fig. 2) a finger $10^a$, and said rod 10 is held frictionally in a guide-box 12, extending from or forming part of the lower end of a post 122, tapped at its upper end to receive a stud-screw 15, by which to confine said post and gage-holder in its adjusted position on an arm 13, slotted at 14, as represented in Fig. 4, the inner end of said arm being fixed to the framework by a suitable bolt $14^×$. The box 12 has at its ends ears $12^a$ $12^b$, that sustain a shaft $a$, surrounded by the shoe-size indicator $a'$, shown as a roller pinned at 48 to said shaft and divided longitudinally into spaces, usually four, (see Fig. 10,) where said indicator, or it may be a covering thereupon, is laid out flat, it being marked to represent spaces for the different styles of shoes—such as boys', youths', little gents', and men's—each of these spaces extending both about the roller for about ninety degrees, being subdivided by scale-marks or index-lines $b$ (see enlarged view Fig. 10) at right angles to the longitudinal axis of the roller to represent the various sizes or lengths of shoes of these different styles. The indicator $a'$ is applied loosely to the shaft $a$, and the roller at the left-hand end of the indicator is provided with a disk $a^×$, (see Fig. 8,) having a series of notches 43, Fig. 9, one for each of the four divisions or different classes of shoes, said notches engaging a stud $a^2$, extending inwardly from the ear $12^a$, said stud maintaining the roller in its adjusted position. That the roller may be readily turned to expose either division the opposite end of its shaft is provided with a thumb-nut $a^3$, and there is a spring $a^4$ interposed between the inner side of the right-hand ear $12^b$ and the end of the roller, said spring acting normally to keep one of the holes in said disk in engagement with the stud referred to. The inner end of this spring may be extended more or less into the roller to thus give it greater freedom of action. The slide-bar 10 may be slid longitudinally, so that the pointer $10^a$, carried thereby, may register with any one of the size-numbers of the various styles of shoes in which it is desired to set hooks automatically on the machine herein to be described. By turning the indicator the division thereof indicating the class or style of the shoe is brought next the pointer $10^a$, and then the slide-bar may be slid to place, the pointer on the line indicating the size of the shoe, and the top gage will be correctly placed for that particular size.

Referring to the end gage 6, it will be adjusted at such a distance from the acting end of the stock-feeding punch $f$ as to insure a definite position for the endmost hook of the left-hand portions of the top of the shoe, this being the part that is usually first provided with hooks, and this adjustment may be for any distance to accord with the particular taste or notion of the manufacturer using the machine, some manufacturers desiring that the endmost hook be situated at one distance from the end of the top of the upper and another one at a different distance, and for this reason this gage is made adjustable, but being once adjusted and fixed in its position the user thereof will not need to further adjust it unless he should make up his mind that he desires to change the position of the first hook at the end to a different distance therefrom. The gage 6 is moved in unison with the frame $C^9$ and punch, as the latter is used to feed the stock and space the hook.

When changing from one-sized shoe to another, there must be a variation in the length of the feed-stroke, and to effect this I connect the block $c^{10}$ by a link $c^{10×}$ with a feed-regulator $C^{14}$, shown as an elbow-lever pivoted at at $C^{15}$ and having at its opposite end sector-teeth $h$. These teeth are engaged by sector-teeth $h'$ of a spacer, shown as a lever $h^2$, pivoted at $h^3$ and provided with a pointer $h^4$. The pivot $h^3$ for this lever is extended through the bifurcated end $h^5$ of a yoke or box $h^6$, pivoted at $h^7$ on a projection $h^8$, forming part of the framework of the machine. The stud $h^3$, that serves as the fulcrum for the lever $h^2$, receives loosely upon it between its head $h^{3×}$ and the outer side of one of the bifurcated arms $h^5$ a rotary dial $n$, that in the present instance of my invention receives on its face an index $n^×$, preferably of paper or some other material the face of which may be divided, as represented in Fig. 1, into four equal parts or quarters, marked, respectively, "Boys'," "Youths'," "Little gents'," and "Men's," and these spaces are provided with graduations to represent the size of that particular style of shoe—as, for instance, the men's quarter is subdivided into eight spaces and the boys' into ten spaces, &c., the particular number of subdivisions being immaterial. The index, of whatever material, is represented as confined to the disk by means of a screw 30. The threaded end of the stud $h^3$ receives a suitable nut 31 and a check-nut 32 to confine the stud in position. The disk and its index are capable of being rotated about the stud to bring within the line of movement of the pointer $h^4$ the particular space or division representing the shoes that are to have the lacing-hooks applied thereto—as, for instance, in Fig. 1 the division for boys occupies its working position. The rear side of the disk is provided with a notch for each space, and coacting with said notch is a pin 33, contained in a hollow post 34, inserted through the bifurcated block, (see Fig. 5,) where the head of said pin is acted upon by a spring 35, made adjustable as to its strength by a screw 36. It will be obvious that by taking hold of the milled edge of the disk the latter may be turned, overcoming the force of the spring, and whenever a new hole at the back of the disk comes opposite the pin the latter will pop into the same and lock the disk in its adjusted position.

The pointer $h^4$ is shown as occupying a position opposite the ninth one of the divisions from its lower end, which may be supposed to represent a size 9, boy's shoe, and the finger $10^a$ as on the corresponding line of the indicator $a$. As the lever is turned to bring the pointer in its desired position the toothed portion of the lever $h^2$ engaging the toothed portion of the lever $C^{14}$ moves the head $c^{10}$, so that its stud $c^9$ is moved in the slot $d^{30}$ of the arm referred to, and consequently the throw of said arm is made more or less to move the slide $C^9$, containing the combined top set and punch, for a greater or less distance to feed the stock, as provided for in said application. So it will be understood that preparatory to setting hooks in shoes the first thing to do is to regulate the feed-stroke of the combined upper set and punch, and this done the operator will turn the indicator to bring to its front side the particular division corresponding with the division of the disk which is brought into operative position, and he will then move the slide-bar and place the pointer opposite the division corresponding to that upon which the pointer coacting with the disk $n$ is set.

In operation let it be supposed that the user of the machine has set the gage 6 into the position desired to establish the position of the first hook to be set in the left-hand part of the top. Now the workman will place the end 50 of the left-hand part of the top in line with the edge of the gage 6 (see Fig. 7) and will place the edge 41 of said part of the top against the edge gage $e$. This done the machine may be started, the punch will descend, make a hole in the top or stock, and while in the top will be moved laterally toward the left, taking with it the gage 6, the punch stopping in its lateral movement immediately over the shank of the hook to be set, it being then held by said hook-sustaining plate or in other usual manner, at which time the usual plunger carrying said hook-sustaining plate is raised, as provided for in said application, while the presser-foot holds the stock down on the work-support and forces the shank of the hook through the hole in the top made by the punch and about the end of the punch yet in said hole and forces the end of the hollow shank of the hook against the top set $C^{10}$, thus setting the same. The presser-foot descends on the stock in usual manner preparatory to forcing into the stock the hook to be set. The stud having been set, the combined upper set and punch are raised and the slide and punch are moved backwardly to their starting-point, while the presser-foot remains down, clamping the stock on the work-support, and having arrived at their starting-point the punch again descends, entering the stock and punches a new hole for the next hook to be set, and the presser-foot is then raised to unclamp the stock, while the combined top set and punch are again moved to feed the stock. The number of feeding strokes taken by the punch depends upon the number of hooks to be set in the left-hand side of the stock. Now to set hooks in the right-hand side $S'$ of the top of the shoe the workman places the top end of said right-hand side into the corner of the top gage 8, the corner 48 of the right-hand side of the top meeting the portion $8^\times$ of said gage 8, the edge 40 of the top at a distance therefrom contacting with the usual edge gage $e$. In this position the machine is again started, and at the first descent of the combined punch and set a hole is punched in the top, the latter is fed by the punch, and the first or lower hook for the right-hand side of the shoe is set, and thereafter the stock is fed as described until the same number of hooks are set one after the other in the right-hand side of the top that were set in the left-hand side of the top, the last hook to be set being the one at the top end of the right-hand side of the upper.

The head $C^9$ herein shown is also common to United States Patent No. 686,928.

I believe that I am the first to combine in a machine having a slide-frame a stock-feeding punch with a top end gage and move the same to and fro in unison with said slide-frame.

The top gages shown in this application are sustained one by the sliding frame carrying the punch used to feed the stock over the work-support, while in application, Serial No. 178,241, filed October 23, 1903, both end gages are sustained by and move in unison with the slide-frame or device that carries the punch, the latter being reciprocated vertically in said frame and acting to feed the stock over the stock-support. I have claimed in said application, broadly, end gages movable with whatever is employed to feed the stock.

Having fully described my invention, what I claim as new, and desire to secure by Letters Patent, is—

1. In a machine of the class described, a punch and set, means to cause the punch to enter and feed the shoe-upper, a top end gage movable with said punch during its feeding operation, and another top end gage sustained independently of said punch and made adjustable with relation to said first gage according to the size of the shoe being provided with hooks.

2. In a machine of the class described, a movable slide-frame, a top end gage connected therewith and adjustable longitudinally thereon, a punch carried by said frame, means to move the punch to enter the material, and means to move the frame to feed the material, combined with a second longitudinally-adjustable top end gage sustained by the framework of the machine and occupying a stationary position with relation to the top end gage sustained by said slide-frame, a finger movable with said second top end gage in its adjustment, and an indicator coacting with finger.

3. In a machine of the class described, a slide-frame, a combined punch and set carried thereby, means to move said slide-frame to and fro, means to cause the punch to enter the stock and feed the latter as the slide-frame is moved in one direction, a top end gage connected with said slide-frame and movable therewith in its to-and-fro movements.

4. In a machine of the class described, a stock-support, a slide-frame provided with a set and punch, a top end gage fixed to and movable only longitudinally with said head, and another adjustable top end gage separated from said frame.

5. In a machine of the class described, a stock-support, a slide-frame provided with a set and punch, a top end gage fixed to and movable only longitudinally with said frame, and another adjustable top end gage sustained independently of said frame, combined with an edge gage intermediate said top end gages.

6. In a machine of the class described, a slide-frame having a boss at its lower end, a punch located in said boss, a collar surrounding said boss, and a top end gage adjustable laterally on said collar.

In testimony whereof I have signed my name to this specification in the presence of two subscribing witnesses.

PERLEY R. GLASS.

Witnesses:
LOUIS C. SMITH,
MARGARET A. DUNN.